US012585681B2

(12) United States Patent
Li et al.

(10) Patent No.: US 12,585,681 B2
(45) Date of Patent: Mar. 24, 2026

(54) METHODS FOR CONVERTING ELECTRONIC PRESENTATIONS INTO AUTONOMOUS INFORMATION COLLECTION AND FEEDBACK SYSTEMS

(71) Applicant: ORIGIN VENTURES LIMITED, Hong Kong (CN)

(72) Inventors: Tong Li, Toronto (CA); Qianfei Wang, North York (CA)

(73) Assignee: ORIGIN VENTURES LIMITED, Hong Kong (CN)

( * ) Notice: Subject to any disclaimer, the term of this patent is extended or adjusted under 35 U.S.C. 154(b) by 162 days.

(21) Appl. No.: 18/466,814

(22) Filed: Sep. 13, 2023

(65) Prior Publication Data

US 2025/0086207 A1 Mar. 13, 2025

(51) Int. Cl.
*G06F 16/3329* (2025.01)
*G06Q 10/1093* (2023.01)
*G10L 15/26* (2006.01)
*H04L 51/066* (2022.01)

(52) U.S. Cl.
CPC ..... *G06F 16/3329* (2019.01); *G06Q 10/1093* (2013.01); *G10L 15/26* (2013.01); *H04L 51/066* (2013.01)

(58) Field of Classification Search
CPC . G06F 16/3329; G06Q 10/1093; G10L 15/26; H04L 51/066
See application file for complete search history.

(56) References Cited

U.S. PATENT DOCUMENTS

| | | | |
|---|---|---|---|
| 11,263,397 B1 * | 3/2022 | Yu | G06F 40/169 |
| 2015/0177964 A1 * | 6/2015 | Spirer | G06F 16/4393 |
| | | | 715/732 |
| 2017/0243255 A1 * | 8/2017 | Sahasi | G06Q 30/0277 |
| 2023/0289377 A1 * | 9/2023 | Chopra | G06T 11/206 |
| 2024/0126981 A1 * | 4/2024 | Shahinian | G06F 40/40 |
| 2024/0371089 A1 * | 11/2024 | Yang | G06F 40/56 |

* cited by examiner

*Primary Examiner* — Stella L. Woo
(74) *Attorney, Agent, or Firm* — Conley Rose, P.C.

(57) ABSTRACT

Described are methods and systems to convert electronic presentation slides into autonomous information collection and feedback systems. An electronic presentation file is uploaded via a computer networks to a Presentation Interpretation System (PIS) where the text and other digital contents are extracted, catalogued, and indexed. The extracted digital contents are sent to a Large Language Model System (LLMS). A Chatbot Component is associated with the presentation so as to receive human input and provide relevant feedback from the LLMS. A Calendar and Scheduling Component may also be added to the presentation for users to schedule a meeting or discussion with the presentation publisher. The presentation digital content is stored on an Information Collection and Management System (ICMS) and is reconstituted with the associated Chatbot and Calendaring Components in a format viewable online, and is then provided to viewers from a web server.

12 Claims, 4 Drawing Sheets

METHODS FOR CONVERTING ELECTRONIC PRESENTATIONS INTO AUTONOMOUS INFORMATION COLLECTION AND FEEDBACK SYSTEMS

TECHNICAL FIELD

This disclosure generally relates to methods and systems for creating audiovisual electronic presentations. More particularly, it relates to creating autonomous electronic presentations with the capability of information collection and feedback.

BACKGROUND

Electronic presentations, such as Microsoft PowerPoint files, have become ubiquitous in commerce, education, training, sales and marketing, and other domains of the modern business world.

Electronic presentations may contain digital contents such as text, images, audio, and video, all produced by a presentation publisher. Once produced, presentation slides may be sent or otherwise presented to the intended audience. When sent, such as by email, recipients can browse through the presentation slide by slide or watch a self-playing presentation advance through slides automatically. However, electronic presentations have traditionally functioned as a passive document that gets sent around as part of the communication process, or presented to an audience by a speaker with special knowledge of the subject matter. The presentation itself is usually only for viewing purpose, and does not have any information collection or feedback capability. Additional and separate systems and manual steps must be used to collect viewer information or to provide any feedback to viewers. Such additional systems and steps include email surveys, phone calls, in-person and online meetings, web survey systems, calendaring systems, and other manual information collection systems.

Thus, it would be helpful if the electronic presentation itself was a smart, interactive, and autonomous information system that was able to collect viewer input and provide relevant feedback, and allow users to perform a wide range of tasks without the using separate systems and doing so anonymously, without interference by the presentation publisher. Some helpful interactive features include asking questions and receiving answers, engaging deeper discussions on the topic, arranging a meeting or follow up with the presentation author or publisher, and other tasks that have traditionally been handled by separate systems or entirely manual processes.

SUMMARY

The methods and systems described herein receive electronic presentation slides and convert those slides into autonomous information collection and feedback systems. An electronic presentation file is uploaded via a computer network to a Presentation Interpretation System (PIS), where the text and other digital contents are extracted, catalogued, and indexed. The resulting data is stored in an Information Collection and Management System (ICMS), which may include all of the essential data for multiple presentations.

The extracted digital contents are sent from the PIS to a Large Language Model System (LLMS), to train the language model and to prepare the LLMS to understand the digital contents and to generate feedback in a human readable language, so as to allow viewers to ask questions and receive appropriate answers, engage in deeper discussions on the topic, or drill down to locate additional information. The LLMS may also include a Benchmark Checker Component to ensure that the feedback is accurate and appropriate.

A Chatbot Component is also associated with the presentation in order to provide a user interface directly on the slides shown on a viewer's screen, where the user can enter text or provide voice input which is then transmitted back to the LLMS and where the user can receive relevant responses from the LLMS.

Upon viewing the presentation, viewers may also want to schedule a meeting or follow-up discussion with the presentation author, publisher, or sponsor. Such a meeting or discussion can be either online or offline. A Calendar and Scheduling Component may be displayed on the viewer's screen to present the publisher's calendar and available time slots for the viewer to choose from to schedule the meeting or discussion.

The completed presentation is reconstituted along with the associated Chatbot Component and Calendaring Component in a format that is viewable online by a standard web browser, e.g., HTML, and is then provided to viewers from a web server, such as by a hyperlink. A user can activate the supplied link and view the interactive presentation on any standard web browser. User chat sessions, meeting requests, and other information may also be collected and stored for analysis, such as improving or supplementing the presentation.

In addition to storing all of the presentation text and audiovisual data, as well as the associated catalogues and indices, the ICMS also stores all of the viewer inputs and any feedback generated by the LLMS, as well as calendar appointments, and basic metrics presentation viewings. This viewer data is useful for many purposes, including to improve the presentation.

The methods and systems described herein thus transform ordinary static presentations into smart, interactive, and autonomous information gathering and reporting systems, which are able to collect viewer input and provide relevant feedback, and allow viewers or publishers to perform a wide range of tasks without the using separate systems.

BRIEF DESCRIPTION OF THE DRAWINGS

The disclosed aspects of the systems and methods will hereinafter be described in conjunction with the appended drawings, provided to illustrate and not to limit the disclosed aspects, wherein like designations denote like elements.

DETAILED DESCRIPTION

Figure 1:
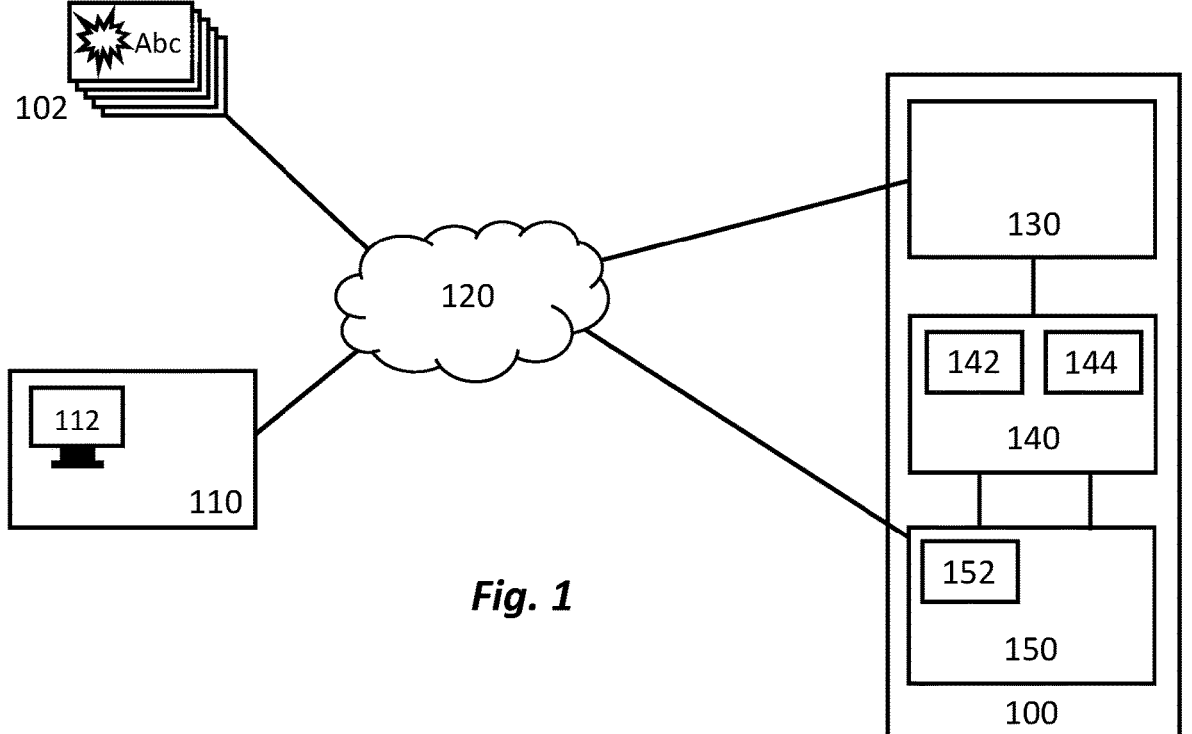
FIG. 1 is a schematic illustration of an exemplary system in which the described methods for creating presentations may be performed.

FIG. 1 depicts a system 100 for converting electronic presentations 102 into autonomous information collection and feedback systems. The system 100 includes three major components: (1) a Presentation Interpretation System (PIS) 130, which receives an electronic presentation file 102 through network 120 and extracts the digital contents (text, images, audio, and video); (2) a Large Language Model System (LLMS) 140, which receives viewer questions and generates appropriate responses in a human readable language; and (3) an Information Collection and Management System (ICMS) 150, which stores the digital content for presentations, as well as stores various data from the viewing history, such as questions asked by the viewer and responses provided by the LLMS 140.

Chatbot Component 142 is also associated with the presentation and provides a user interface on screen 112, where the viewer 110 may enter text or provide voice input, which is then transmitted back to the LLMS 140. The Chatbot Component 142 also receives textual responses from LLMS 140 and displays those response on screen 112. The LLMS 140 also includes a Benchmark Checker Component 144 which verifies that the feedback from the LLMS 140 is accurate and appropriate. The Benchmark Checker Component 144 also maintains the session information of the text input and output from LLMS 140.

In some embodiments, the PIS 130 and ICMS 150 are servers connected to network 120, either separate servers or the same server. The PIS 130 receives the presentation file 102 through the network 120 and ICMS 150 communicates with the viewer 110 through the network 120. The PIS 130, LLMS 140, and ICMS 150 are also interconnected for communicating data between the systems and their components.

A Calendar and Scheduling Component 152 is associated with the presentation on ICMS 150 and is viewable on the screen 112 so that viewer 110 may schedule a meeting or in-person discussion with the presentation author or publisher. In addition to meeting requests and scheduling information, ICMS 150 also stores all other viewer inputs and the feedback generated by LLMS.

Each of the systems and components will now be described in more detail, together with the method steps used to convert electronic presentation file 102 into an autonomous presentation viewable by any standard web browser and able to interact with the viewer in a standard human-readable language.

Presentation Interpretation System (PIS)

Figure 2:
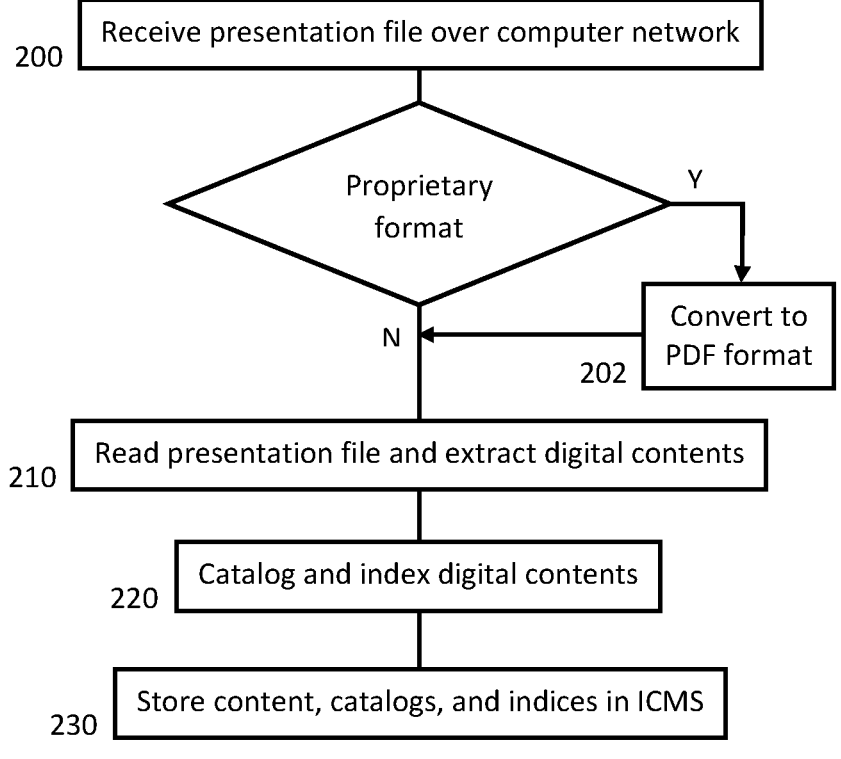
FIG. 2 is a flowchart depicting methods steps associated with an exemplary Presentation Interpretation System (PIS).

Referring to FIG. 1 and the flowchart of FIG. 2, in step 200, Presentation Interpretation System (PIS) 120 receives an electronic presentation file 102 over computer network 120. The slides in file 102 can be in open source format such as PDF, or proprietary formats such as Microsoft Power-Point, Apple Keynote, etc. The slides may also be hosted on a remote computer server and accessible via computer networks through network protocols such as HTTP (hypertext transfer protocol) and FTP (file transfer protocol).

In some embodiments, in step 202, slides in a proprietary format may be converted to PDF format using converter software before continuing with the processing. In other embodiments, reader software is used to directly extract the digital contents from the slides in proprietary formats, without going through the converting process.

In step 210, slides in a non-proprietary format and slides in a PDF format are processed by reader software to extract the digital contents, such as text, images, audio, and video, from the presentation. In step 220, the extracted contents are then catalogued and indexed. The catalogues include tags and classification information concerning the presentation, such as the title and certain texts, as well as subject matter tags (e.g., investment, finance, technology, etc.) so that viewers can effectively search the presentations.

In step 230, the digital contents, catalogues, and indices are stored in Information Collection and Management System (ICMS) 150.

Large Language Model System (LLMS)

Figure 3:
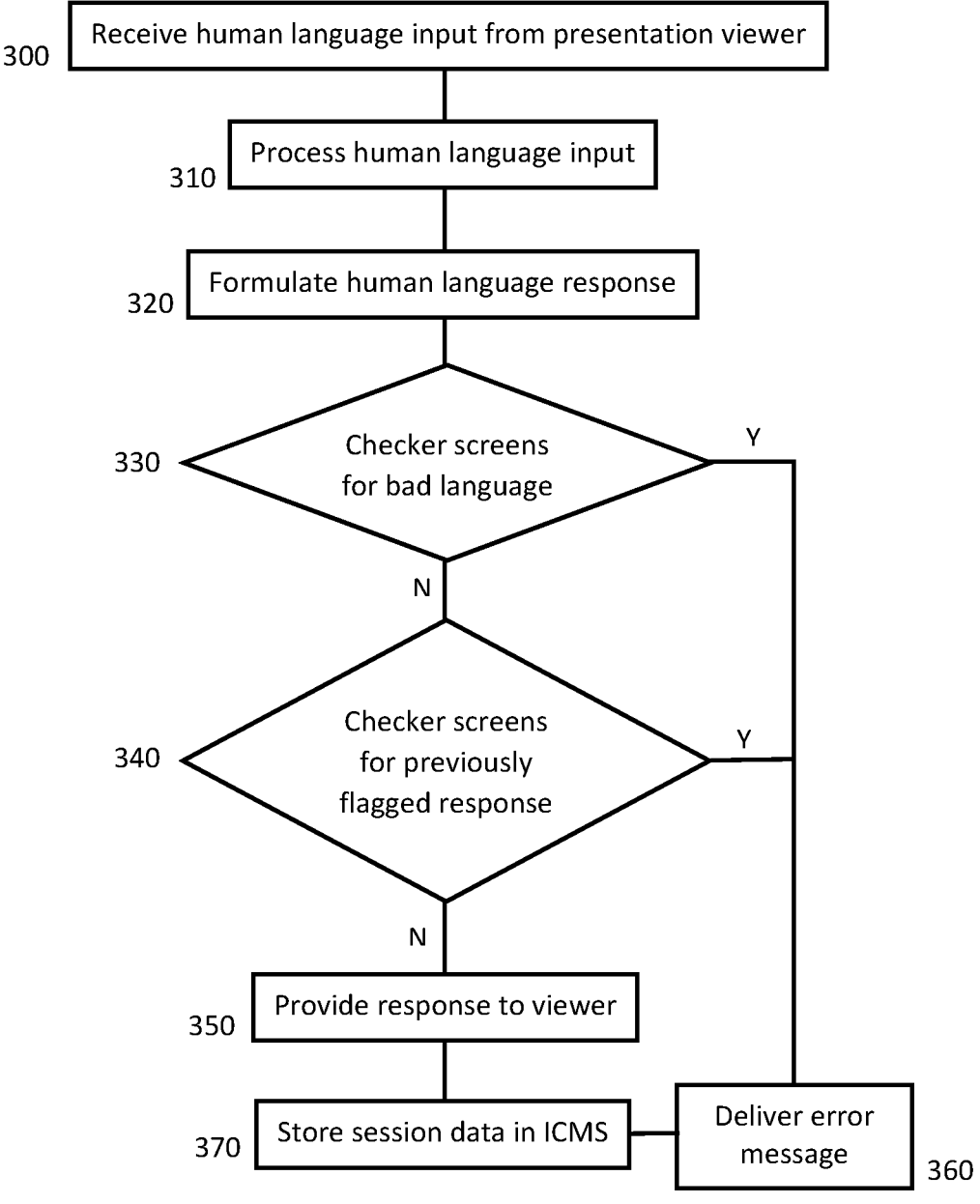
FIG. 3 is a flowchart depicting methods steps associated with an exemplary Large Language Model System (LLMS).

Referring to FIG. 1 and the flowchart in FIG. 3, in step 300, text that was extracted by PIS 130 is provided to Large Language Model System (LLMS) 140 to train it to provide accurate and appropriate responses or feedback concerning the presentation and its topic.

A large language model is a type of artificial intelligence that functions well with human languages. A large language model refers to computer software and hardware systems and algorithms that analyze and tokenize text information and organize the output in human language format. There are two basic types of large language models, proprietary systems such as ChatGPT, and open source systems such as vLLm, Mosaic, or Falcon. LLMS 140 may be either proprietary systems or open source systems.

The LLMS 140 includes a Benchmark Checker Component 144 to verify that answers and other feedback from LLMS 140 are accurate and appropriate. The Benchmark Checker Component 144 is software code that screens responses in step 330 for potential foul or explicit language. In step 340, the Benchmark Checker Component 144 looks up stored responses from previous presentation sessions to determine if the user flagged the response as not useful or otherwise inappropriate. If steps 330 or 340 indicate that the response may be inappropriate, the viewer is presented with an error message in step 360. On the other hand, if steps 330 and 340 do not indicate an inappropriate response, the response is then provided to the viewer in step 350.

The Benchmark Checker Component 144 also maintains the session information of the text input to and output responses from the LLMS 140. At the end of the session, in step 270, the information from the Benchmark Checker Component 144 (input text and corresponding responses and errors) is stored in the Information Collection and Management System (ICMS) 150.

Examples of input and output questions and responses from the LLMS 140 are shown below with respect a presentation titled "Digital Assets and Crypto Report" by Goldman Sachs (Asia) L.L.C. (November 2021):

Q: Who is the author of this presentation?

A: The presentation is authored by Goldman Sachs (Asia) L.L.C. on November 2021.

Q: What are the topics of this presentation?

A: The presentation contains three key agenda:
Engaging with Digital Assets and Blockchain Globally
How Digital Assets Transform the Financial Infrastructure Space
Finding the Opportunities in the Asian Digital Assets Space Q: Does this presentation contain any case study?

A: Yes. Three companies are selected as case studies. They are:
Bullish
Circle
Coinbase Q: What is the relationship between the author and Coinbase?

A: The author, Goldman Sachs, served as Financial Advisor to Coinbase and Lead Adviser to NASDQ for Coinbase's public listing on 14 Apr. 2021.

Q: What is Coinbase's IPO opening price?

A: The opening price of Coinbase on NASDAQ on 14 Apr. 2021 was $381.00 US Dollars.

Q: What are the other tech companies which are also advised when going IPO?

A: Goldman Sachs has served as financial advisor for the largest technology direct listings, including Coinbase, Roblox, Palantir, Slack, and Spotify.

Chatbot Component 142

In FIG. 1, Chatbot Component 142 is depicted as part of the LLMS 140.

However, it should be understood that Chatbot Component 142 is actually a client-side software component that appears on the screen 112 and functions as a user interface between the viewer 110 and the LLMS 140. In embodiments, the Chatbot Component 142 is implemented as a scrolling dialog box where the viewer 110 can provide textual input to the LLMS 140 and receive responses or other feedback from the LLMS 140. The viewer's input can be text or it can be voice. The voice input can be transcoded into text via a server-side speech-to-text converter.

Viewer input is transmitted back to the Information Collection and Management System (ICMS) 150 via the computer network 120. ICMS 150 logs and stores the viewer input, and passes the input to the LLMS 140. LLMS 140 then processes the viewer input and provides the feedback to the Benchmark Checker Component 144. If the feedback is accurate and appropriate, it is passed back to ICMS 150, which stores the feedback and then transmits it via the computer network 120 back to the Chatbot Component 142 on screen 112.

If the feedback generated by the LLMS 140 does not pass the Benchmark Checker Component 144, the ICMS 150 still logs and stores the erroneous feedback so that the feedbacks produced by different types of large language models can be compared and the ICMS 150 can potentially choose the best large language model among several options.

Calendar and Scheduling Component 152

Figure 4:
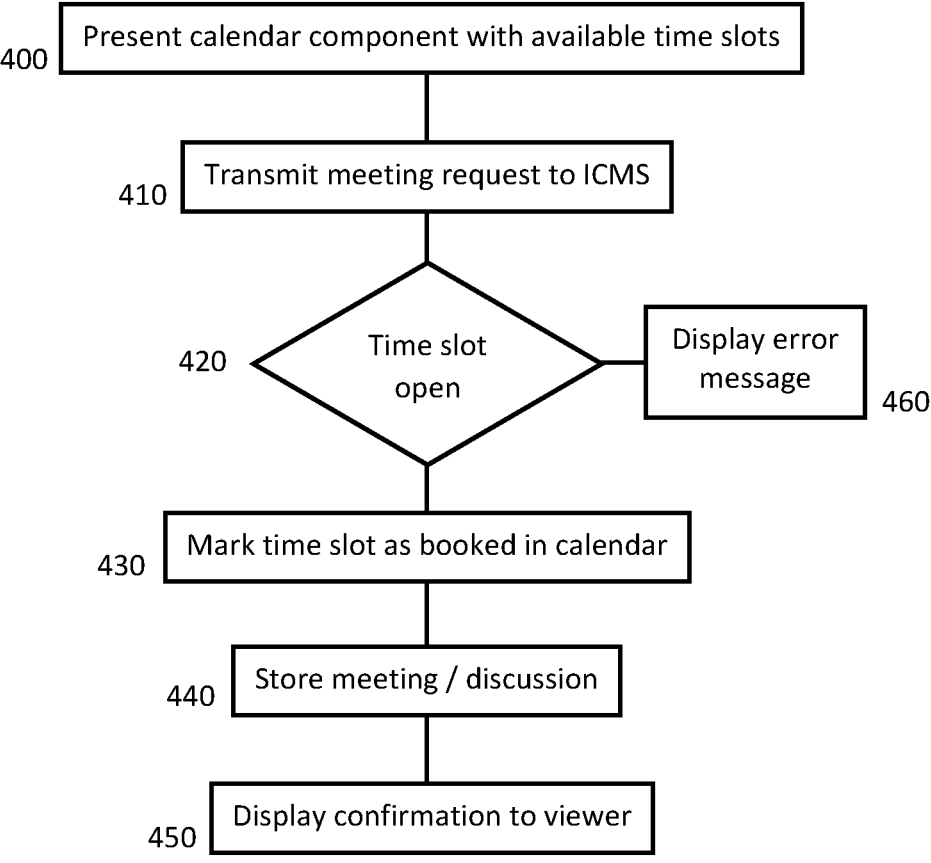
FIG. 4 is a flowchart depicting methods steps associated with an exemplary Calendar and Scheduling Component.

Upon viewing a presentation, a viewer 110 may wish to schedule a discussion or meeting with the presentation author or publisher. This may be common in the case of educational and marketing presentations. As shown in FIG. 1 and the flowchart of FIG. 4, in these situations when the viewer 110 seeks a discussion or meeting with the author or publisher, ICMS 150 may include Calendar and Scheduling Component 152 that operates as a client-side software component. In step 400, the Calendar and Scheduling Component 152 displays a calendar with available time slots on screen 112 so that the viewer 111 of the presentation can schedule a discussion or meeting with the presentation author or publisher.

In step 410, after the viewer 110 chooses a desired time slot, the meeting request is transmitted over the network 120 back to the ICMS 150. In step 420, the Calendar and Scheduling Component 152 checks the time slot availability on first-come-first-served basis or a round-robin basis. If the desired time slot is open, then in step 430, the Calendar and Scheduling Component 152 marks the time slot as booked. In step 440, the Calendar and Scheduling Component 152 logs and stores the meeting or discussion scheduling information in the ICMS 150. In step 450, a confirmation of success is passed back to the viewer 110 via network 120 and the client-side software component which displays the confirmation on screen 112. If the desired time slot is not available, then in step 460, an error message is passed back to the viewer 110.

Information Collection and Management System (ICMS) 150

In some embodiments, the Information Collection and Management System (ICMS) 150 may be a separate server connected to network 120. The ICMS is also connected to the LLMS 140 to send and receive viewer input and feedback from the LLMS 140. The ICMS is also connected to the PIS 130 to receive extracted data, catalogues, and indices generated from the electronic presentation file 100. In other embodiments, the ICMS and one or both of the LLMS 140 and PIS 130 may reside on the same server.

All of the relevant data generated by the system 100, such as presentation data, catalogues, and indices; input from viewer 110; feedback generated by LLMS 140; and meeting scheduling requests and results generated by the Calendar and Scheduling Component 152, are all are logged and stored in the ICMS 150. The ICMS is also accessible by a local and network accessible management console to view any of the available data. For example, data from the LLMS 140 may be reviewed to gain insights how to improve presentations, and data from Benchmark Checker Component 144 may be reviewed to help choose a more effective large language model to use in the LLMS 140.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the scope of the invention. Thus, the present invention is not intended to be limited to the embodiments shown herein but is to be accorded the widest scope consistent with the principles and novel features disclosed herein.

What is claimed is:

1. A method of creating a presentation comprising the following steps:

receiving an electronic presentation file through a network communication, wherein the electronic presentation file comprises presentation slides with text and audiovisual elements;

extracting the text and audiovisual elements from the presentation slides;

storing the extracted text and audiovisual elements on a server attached to the network;

training a large language model system (LLMS) with the extracted text;

associating a chatbot interface with the LLMS, the chatbot interface providing an input configured to query the LLMS and an output configured to display feedback from the LLMS;

upon demand received remotely through the network, assembling the extracted text and audiovisual elements stored on the server into dynamically assembled presentation slides that are configured to be viewable remotely over the network by a web browser;

providing the chatbot interface along with the dynamically assembled presentation slides over the network, wherein the input and output of the chatbot interface is accessible remotely through the network;

receiving a remote input query from the chatbot interface over the network;

providing the input query from the chatbot interface to the LLMS; and providing an output feedback from the LLMS to the chatbot interface over the network;

creating a calendar and scheduling component associated with the dynamically assembled presentation slides, wherein the calendar and scheduling component is accessible remotely over the network; and upon request received through the network, providing through the calendar and scheduling component a list of times when the author or publisher of the presentation file is available to discuss the presentation file or to meet with a person regarding the presentation file.

2. The method of claim 1 further comprising the following steps:

receiving a time for the discussion or meeting that was selected through the calendar and scheduling component; and providing through the calendar and scheduling component a confirmation that the selected time for the discussion or meeting is confirmed.

3. A method of creating a presentation comprising the following steps:

receiving an electronic presentation file through a network communication, wherein the electronic presentation file comprises presentation slides with text and audiovisual elements;

extracting the text and audiovisual elements from the presentation slides:

storing the extracted text and audiovisual elements on a server attached to the network;

training a large language model system (LLMS) with the extracted text;

associating a chatbot interface with the LLMS, the chatbot interface providing an input configured to query the LLMS and an output configured to display feedback from the LLMS;

upon demand received remotely through the network, assembling the extracted text and audiovisual elements stored on the server into dynamically assembled presentation slides that are configured to be viewable remotely over the network by a web browser;

providing the chatbot interface along with the dynamically assembled presentation slides over the network, wherein the input and output of the chatbot interface is accessible remotely through the network;

receiving a remote input query from the chatbot interface over the network;

providing the input query from the chatbot interface to the LLMS;

providing an output feedback from the LLMS to the chatbot interface over the network;

creating a hyperlink to the dynamically assembled presentation slides stored on a web server, and wherein the demand received remotely for assembling the extracted text and audiovisual elements is the activation of the hyperlink.

4. A method of creating a presentation comprising the following steps:

receiving an electronic presentation file through a network communication, wherein the electronic presentation file comprises presentation slides with text and audiovisual elements;

extracting the text and audiovisual elements from the presentation slides;

storing the extracted text and audiovisual elements on a server attached to the network;

training a large language model system (LLMS) with the extracted text;

associating a chatbot interface with the LLMS, the chatbot interface providing an input configured to query the LLMS and an output configured to display feedback from the LLMS;

assembling the extracted text and audiovisual elements into dynamically assembled presentation slides that are configured to be viewable remotely over the network by a web browser;

providing the chatbot interface along with the dynamically assembled presentation slides over the network, wherein the input and output of the chatbot interface is accessible remotely through the network;

providing a calendar and scheduling component along with the dynamically assembled presentation slides, wherein the calendar and scheduling component is accessible remotely over the network; and receiving a selected time for the discussion or meeting through the calendar and scheduling component.

5. The method of claim 4 further comprising the step of converting the electronic presentation file to a PDF file, and wherein the step of extracting the text and audiovisual elements is extracting text and audiovisual elements from the PDF file.

6. The method of claim 4 further comprising the following steps:

screening the output feedback from the LLMS before providing it to the chatbot interface, wherein the screening comprises determining whether the output is an inappropriate response to the input; and if the screening indicates that the output feedback is inappropriate, providing an error message in place of the output feedback.

7. The method of claim 4 further comprising the steps of cataloguing and indexing the extracted text and audiovisual elements, and providing remote access to search the catalogues and indices through the network.

8. The method of claim 4 further comprising the following steps:

storing a plurality of input queries and output feedbacks associated with dynamically assembled presentation slides when viewed remotely;

providing a management interface to remotely view the stored input queries and output feedbacks over the network.

9. The method of claim 8 further comprising the step of selecting an alternative LLMS based on viewing the stored input queries and output feedbacks associated with the existing LLMS.

10. The method of claim 4 wherein the chatbot interface is provided through the network to a remote computer screen and is viewable with a standard web browser, such that the input and output of the chatbot interface is viewable on the screen.

11. The method of claim 4 further comprising the following steps:

providing a voice input query to the chatbot interface;

converting the voice input query to a textual query using a speech-to-text component; and querying the LLMS with the textual query.

12. The method of claim 4 further comprising the step of creating a hyperlink to the dynamically assembled presentation slides stored on a web server, and providing the hyperlink access the presentation slides remotely over the network.

* * * * *